Patented July 8, 1924.

1,500,995

UNITED STATES PATENT OFFICE.

RICHARD OWEN JONES, OF LONDON, ENGLAND, ASSIGNOR TO COURTAULDS LIMITED, OF LONDON, ENGLAND.

MANUFACTURE OF CAUSTIC SODA.

No Drawing.    Application filed March 9, 1923.   Serial No. 624,030.

*To all whom it may concern:*

Be it known that I, RICHARD OWEN JONES, a subject of the King of Great Britain, residing at 161 Tulse Hill, in the county of London, England, have invented new and useful Improvements in or Connected with the Manufacture of Caustic Soda, of which the following is a specification.

In the ordinary method of manufacturing caustic soda from sodium carbonate, by causticizing with lime it is usual to work with dilute solutions. It has long been known that the reaction:—

$$Ca(OH)_2 + Na_2CO_3 \rightleftarrows 2NaOH + CaCO_3.$$

is reversible and that the higher the concentration of the sodium carbonate solution, the lower will be the proportion converted into caustic soda. Consequently it has been the practice to work towards solutions of approximately 8 per cent strength giving a conversion to caustic soda of about 92 per cent of that theoretically obtainable. It has therefore been hitherto necessary, when more concentrated solutions are, or solid caustic soda is, required, to evaporate a large quantity of water, amounting to many tons for each ton of caustic soda produced.

According to the present invention solutions of caustic soda up to about 24 per cent strength and practically free from sodium carbonate can be obtained directly without any process of evaporation. The causticizing is carried out so as to obtain the maximum concentration of caustic soda in solution, and then the unconverted sodium carbonate is removed and recovered, by subjecting the liquor to such a temperature as will cause the desired amount of sodium carbonate to crystallize out as the decahydrate, and the solution to be simultaneously concentrated. For instance, by causticizing, as completely as possible, with lime, a 27 per cent solution of sodium carbonate, a liquor is obtained containing about 15 per cent caustic soda and about 7.1 per cent of sodium carbonate. If this clear liquor be then cooled to below zero centigrade, the sodium carbonate gradually separates out as the deca-hydrate, the amount left in solution depending upon the temperature to which the liquor is cooled. Thus, if the liquor be cooled to 15 degrees below zero centigrade the liquor will contain about 18.3 per cent caustic soda and only 0.8 per cent sodium carbonate. If a solution of caustic soda of higher concentration than 18 per cent be required, this can be obtained, for instance, by taking the liquor produced according to the process of British Letters Patent No. 182,661 and containing 19 to 20 per cent of caustic soda and from 5 to 6 per cent of sodium carbonate and cooling it to a temperature of, or about, 15° below zero centigrade, whereby a liquor is obtained containing approximately 23 per cent of caustic soda and only 1 per cent of sodium carbonate. If it be desired not to remove so much of the sodium carbonate, then the liquor need not be cooled to so low a temperature, the requisite temperature to which it will be cooled being in accordance with the degree of purity required.

The following are examples of how this invention may be performed, but it is not limited to these examples. The parts are by weight.

*Example 1.*

660 parts of sodium carbonate are dissolved in 2,000 parts of water and the solution is heated to 90° centigrade. The liquor is stirred whilst 300 parts of quicklime are added gradually, the heat of the reaction being sufficient to maintain the requisite temperature. When the reaction has subsided, the heating is continued, the mixture being kept boiling for an hour, maintaining the volume approximately constant. The liquor is filtered off from the calcium carbonate and contains approximately 14.5 per cent of caustic soda and 7.8 per cent of sodium carbonate. This solution is gradually cooled in any suitable manner for instance by means of cold brine circulating through coils in a tank, or by the direct expansion of ammonia in the coils, or by allowing the liquor to flow over coolers. As the temperature falls the sodium carbonate gradually crystallizes out until, at a temperature of 15 degrees below zero centigrade, only about 0.8 per cent of sodium carbonate remains in solution while the caustic soda content has increased to about 18 per cent. Whilst the solution is still at 15° below zero the crystals are removed therefrom in any suitable way such as by means of a centrifugal machine. The sodium carbonate crystals may, without any washing being requisite, be utilized for the production of a further quantity of caustic soda. The filtered cold liquor may be circulated through coils and used for pre-cooling a further batch of liquor thereby greatly economizing in power required for refrigeration.

*Example 2.*

A solution containing from 19 to 20 per cent of caustic soda and 5 to 6 per cent of sodium carbonate, such, for instance, as that which can be obtained by the process described and claimed under the aforesaid British Letters Patent No. 182,661, is cooled down to 15 degrees below zero centigrade, as described in the preceding Example 1, whereupon the bulk of the sodium carbonate separates out as the deca-hydrate. The crystals are removed from the cold liquor and a solution containing about 24 per cent caustic soda and only about 1.0 per cent sodium carbonate is obtained.

The process according to this invention can be applied to solutions containing from 12 per cent to 27 per cent of caustic soda and from 1 per cent to saturation of sodium carbonate and yields a caustic soda solution of a high degree of purity and of a concentration suitable, for example, for mercerizing cotton, for treating cellulose for the manufacture of viscose, or for soap making, without the necessity for any evaporation.

What I claim is:—

1. The preparation of solutions containing from 15 to 25 per cent of caustic soda and not more than 1.0 per cent of sodium carbonate by first causticizing, with lime, a solution of sodium carbonate and then cooling the filtered liquor, containing caustic soda and sodium carbonate, to a temperature between zero and 15 degrees below zero centigrade until the sodium carbonate has crystallized out, it being then removed; all substantially as hereinbefore explained.

2. In the manufacture of caustic soda, the steps of chilling below 0° C. a causticized sodium carbonate solution, and separating from the cold solution the crystallized sodium carbonate.

3. In the manufacture of caustic soda, the steps of chilling below 0° C. a causticized sodium carbonate solution, and separating from the cold solution the crystallized sodium carbonate, and then passing the clear liquor through heat exchange apparatus to pre-cool a succeeding batch of solution.

In testimony whereof I have signed my name to this specification in the presence of two subscribing witnesses.

RICHARD OWEN JONES.

Witnesses:
EMILE VAN WEYENBERGH,
HENRY DENT GARDNER.